UNITED STATES PATENT OFFICE.

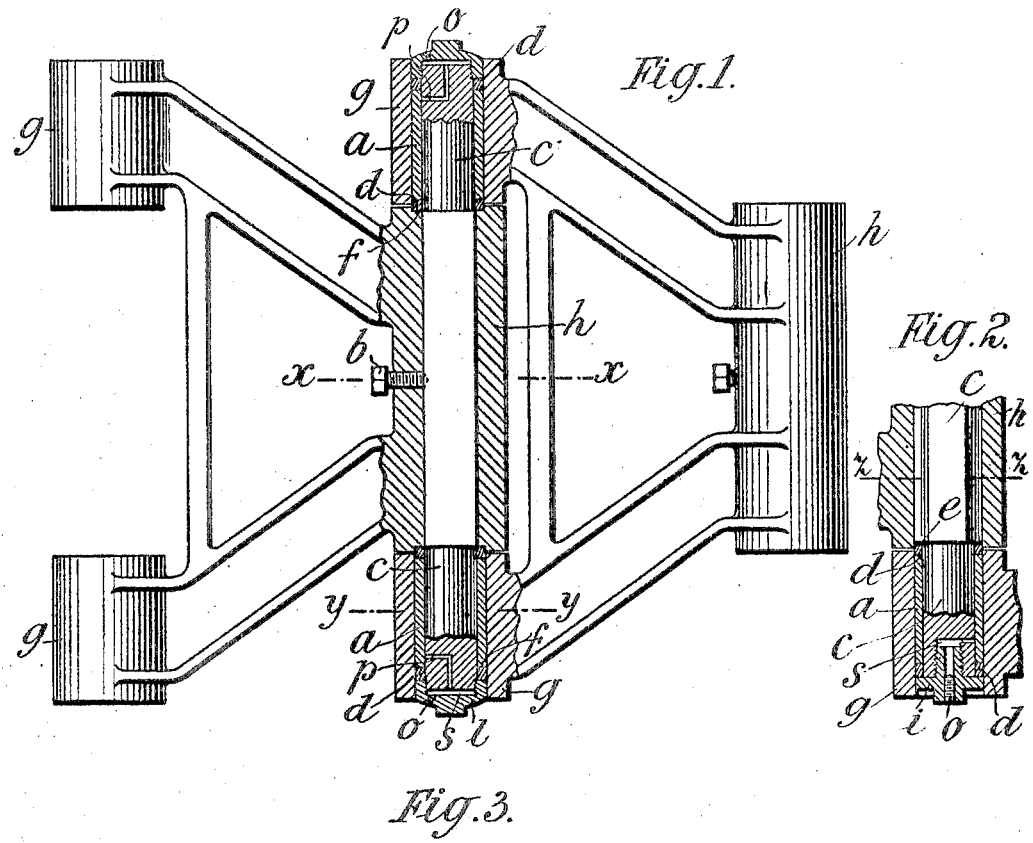
No. 797,641. PATENTED AUG. 22, 1905.
W. THOMPSON.
DRIVING CHAIN.
APPLICATION FILED NOV. 24, 1902.

WILLIAM THOMPSON, OF LONDON, ENGLAND.

DRIVING-CHAIN.

No. 797,641.  Specification of Letters Patent.  Patented Aug. 22, 1905.

Application filed November 24, 1902. Serial No. 132,673.

*To all whom it may concern:*

Be it known that I, WILLIAM THOMPSON, a subject of the King of Great Britain and Ireland, residing at Nos. 1 and 2 Great Winchester street, in the city and county of London, England, have invented certain new and useful Improvements in Driving-Chains for Dredgers and other Apparatus; and I do hereby declare the following to be a full, clear, and exact description of the invention, such as will enable others skilled in the art to which it appertains to make and use the same.

This invention for improvements in driving-chains for dredgers and other apparatus has for its object to construct the chain in such manner that it shall be impossible for dust or dirt to find its way to the wearing-surfaces of the joints, that the parts liable to wear can be readily removed and replaced, that the joints can be readily oiled, and that a dredger-bucket or other appliance can be readily and firmly secured to the links; and it consists in providing the wearing-surfaces of the links with bushes that cannot rotate in the links, and in providing gaskets or packings at the parts where dust or dirt might get in, and in providing means for compressing the packings, and also in providing a ready means for oiling the joints.

In the accompanying sheet of illustrative drawings, Figure 1 is a sectional front elevation of a chain constructed according to this invention. Fig. 2 is a section showing a slightly-modified form of joint. Fig. 3 is a side elevation; and Figs. 4, 5, and 6 are cross-sections at $x\ x$, $y\ y$, and $z\ z$.

The usual openings in the ends of the outer part $g$ of the link of the joint are fitted with bushes $a$, that are prevented from turning in the links by making the openings square or other suitable unround shape, as shown in the cross-sections, or by means of a set-screw, cotter-pin $b$, or the like. The pin $c$, connecting or joining two links, is cylindrical and fixed in the outer part of the link $h$ by a screw $b$. Packings or gaskets $d$ are inserted between the inner ends of the bushings and a shoulder $e$ on the pin or a recessed shoulder $f$ in the outer end of the inner part of the link $h$ of the joint and between the outer ends of the bushings and a cap-fitting $i$ or $l$, that is screwed onto or into the end of the pin. By screwing up the cap the packings $d$ are compressed. The pin may be of the same size throughout when recesses are formed in the outer faces of the inner part of the link $h$ to receive, say, one-half of the length of the packing, or the pin is reduced at the ends on which the bushes of the outer link work, the reduced diameter being continued beyond the inner ends of the bushes to form a space for the packing or gasket. The cap $l$ is screwed onto the end of the pin or is formed with a shank screwing into the pin, as shown at $i$. The cap is perforated with an oil-hole closed by a small screw $o$, and a hole $p$ in the pin extends from the chamber formed between the cap and the pin to the outer or working surface of the pin. An oil-chamber $s$ is thus formed between the cap and the connecting-pin. By this construction of link-joint the bushes $a$, that take the wear, can readily be removed and replaced by new ones, being simple cylinders having the same cross-section throughout their length and not requiring any fixing except that given by the clamping action of the caps.

What I claim, and desire to secure by Letters Patent, is—

1. A joint for a link chain, comprising the inner link part, the outer link parts, the connecting-pin fitting in and prevented from turning in the inner link part, bushes on the pins, having a polygonal exterior engaging the outer link parts, caps to retain the bushes screwed to the outer ends of the connecting-pin, and packings between the ends of the bushes and the adjacent parts.

2. A joint for a link chain, comprising the inner link part, the outer link parts, the connecting-pin fitting in and prevented from turning in the inner link part and having cylindrical ends bushes on the pins, having a polygonal exterior engaging the outer link parts, caps to retain the bushes screwed to the outer ends of the connecting-pin, and packings bearing against the inner ends of the bushes and the shoulders on the connecting-pin, and packing bearing against the outer ends of the bushes and the caps.

3. A joint for a link chain, comprising the inner link part, the outer link parts, the connecting-pin fitting in and prevented from turning in the inner link part, bushes on the pins, having a polygonal exterior engaging the outer link parts, caps to retain the bushes screwed to the outer ends of the connecting-pin, packings between the ends of the bushes and the adjacent parts, there being an oil-chamber between the cap and the pin and communicating with the movable surfaces of joint.

In testimony whereof I have affixed my signature in presence of two witnesses.

WILLIAM THOMPSON.

Witnesses:
  WILLIAM ARTHUR BENNETT,
  HARRY ELLMERS.